Dec. 15, 1959   H. BÄUMLER ET AL   2,917,353
TENSIONING SPRING FOR PISTON RINGS
Filed March 25, 1958
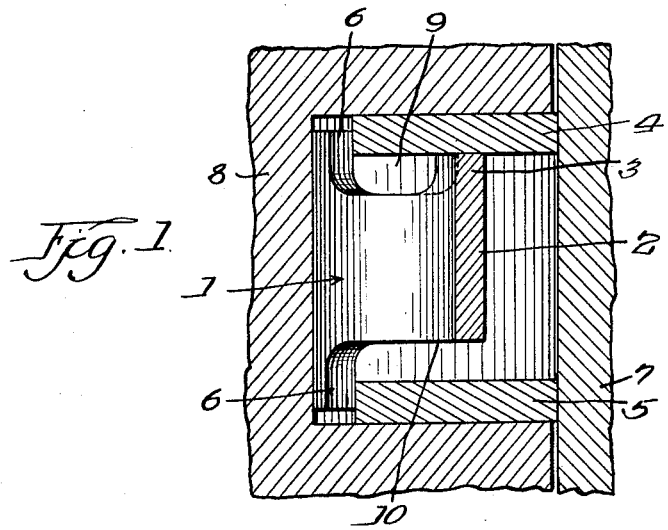
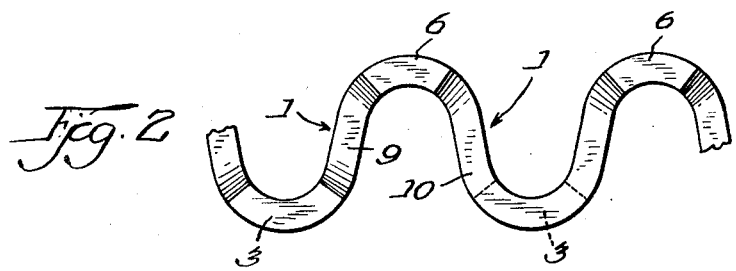
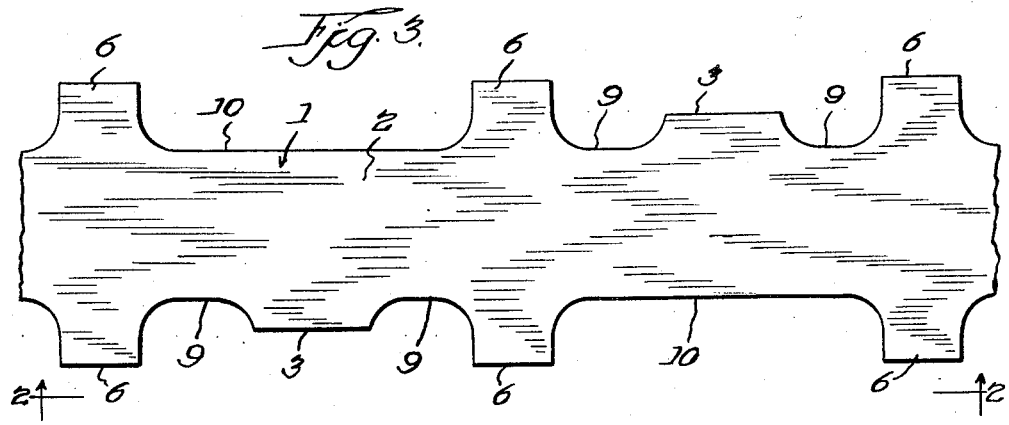
Inventors.
Hermann Bäumler, &
Ernst Fuhrmann.
By [signature] Atty.

2,917,353

TENSIONING SPRING FOR PISTON RINGS

Hermann Bäumler and Ernst Fuhrmann, Burscheid, Germany, assignors to Goetzewerke Friedrich Goetze Aktiengesellschaft, Koln, Germany, a corporation of Germany Application March 25, 1958, Serial No. 723,885

Claims priority, application Germany April 18, 1957

2 Claims. (Cl. 309—40)

This invention is concerned with an undulating, tangentially and radially resilient spring for bracing band shaped piston rings.

Piston rings have become known for oil-wiping and oil regulating in four cycle internal combustion engines, comprising two axially relatively short and thin steel bands which are axially and radially braced by a tensioning spring or the like. The advantage of such structure is that the piston rings can follow irregularities of the cylinder wall, without any particular mutual interference, thereby regulating the oil economy of the engine. In order to make the structure as simple as possible and yet, reliable, tensioning springs have been proposed (U.S. Patent No. 2,635,022) undulating in radially extending sections. At the sections facing the groove base in the piston, there are provided barlike extensions which engage the piston rings interiorly to press them radially against the cylinder wall, the piston rings lying upon the flanks of the radially extending undulations of the tensioning spring. Recesses are formed at the central portions of the spring for draining off the oil, such, that a barlike part remains within the portion of the piston gliding surface as well as in the portion of the section facing the groove base, such barlike portion preventing axial resiliency. Tensioning springs of this type act only tangentially and radially, and it is, therefore, necessary to machine the flanks thereof accurately, so as to avoid fluttering or knocking within the piston groove. Oil rings of this kind are especially suitable for use in run-down engines for normalizing the oil economy. However, it has been found that the piston grooves, particularly in run-down engines, do not exhibit the original dimensions, requiring some machining thereof.

It is also known to support or brace band-shaped oil-wiping piston rings by axially and radially resilient tensioning springs. However, two springs are necessary for this purpose, one for the radial and another one for the axial spring action, whereby one spring has been disposed between the two piston rings, the other spring resting alternately against the inside of the piston rings and the base of the piston groove. It has been found in connection with piston rings tensioned by a spring depending upon the base of the groove, that they are difficult to install and that they are not suitable in all instances.

The invention proceeds from the state of the art mentioned first. It is in accordance with the invention proposed to overcome the indicated drawbacks, by providing a tangentially and radially resilient tensioning spring with radially extending undulating sections, which exerts resilient forces in axial direction of the piston rings exclusively by means of the sections operative against the outer half of the piston rings over the end surfaces thereof. The axial bracing of the piston rings upon the outer halves, by the spring, prevents lifting of the piston rings from the piston groove flanks. A re-working of the piston groove in accordance with customary tolerances will then be unnecessary. The invention and the installation are simplified since the spring is unitary and since the band-shaped piston rings are radially tensioned independent of the piston groove base. It will be possible to use a properly constructed spring for piston rings of different dimensions because only the length need be varied due to the tangential spring action.

The oil openings are preferably provided in the flanks of the expanded spring. In order to obtain in simple manner an axially effective spring action, each second of the undulating sections facing the cylinder surface, is in engagement with the piston ring respectively associated therewith. Sufficient axial resiliency results from the alternating arrangement of the engaging surfaces.

In order to obtain axial resiliency, the oil openings may also be provided in the spring sections facing the cylinder wall in such a manner that they extend to a bar provided in the rearward sections. Two radially extending sections are formed in this manner providing for good axial resiliency.

The various objects and features of the invention will appear from the description of an embodiment rendered below with reference to the accompanying drawing, in which Fig. 1 shows an embodiment in cross sectional view;

Fig. 2 is an edge view of the tensioning spring; and

Fig. 3 shows the tensioning spring in developed view.

The tensioning spring 1 is an undulating structure and adapted to exert spring action tangentially, radially and axially. Portions 3 of the frontal sections 2 form surfaces for bracing the band shaped piston rings 4 and 5. Barlike extensions 6, 6' formed by the inner spring sections engage the piston rings 4, 5 inside thereof and press these rings radially against the wall of the cylinder 7. The tensioning spring 1 and the piston rings 4, 5 are disposed within a groove of the piston 8. Recesses 9 and 10 are formed in the flanks of the tensioning spring to provide for the passage of oil.

Changes may be made within the scope and spirit of the appended claims.

We claim:

1. A tangentially and radially resilient tensioning spring for bracing band-shaped piston rings in assigned position within a piston recess with respect to the wall of the associated cylinder, said spring comprising a circularly extending body forming meandering radially directed undulations, oppositely disposed extensions carried at the apices of undulations of said spring which are positioned at the base of said recess and extending in axial directions for engagement with the radially inner edges of said piston rings to exert resilient pressure thereon so as to tension said piston rings radially in the direction of the cylinder wall, and further extensions carried at the apices of intermediate undulations, the last-mentioned extensions on alternate apices being similarly disposed in the same axial direction for engaging the face of an adjacent piston ring and the last-mentioned extensions on the intermediate apices being similarly disposed in the opposite axial direction for engaging the face of an adjacent piston ring, said last-mentioned extensions being operative to exert and maintain axially effective resilient pressure on said piston rings.

2. A tensioning spring according to claim 1, wherein recesses are provided along the edges of said spring to form openings for the passage of oil.

References Cited in the file of this patent

UNITED STATES PATENTS 2,831,738     Marien  ---------------- Apr. 22, 1958